United States Patent [19]
Shaw

[11] 3,942,752
[45] Mar. 9, 1976

[54] WALL RACK FOR LIQUEFIED GAS BOTTLES

[76] Inventor: Don Hartwell Shaw, 4976 E. Stanley, No. 22, Las Vegas, Nev. 89110

[22] Filed: Apr. 29, 1974

[21] Appl. No.: 464,988

[52] U.S. Cl. ............................ 248/311 R; 248/310
[51] Int. Cl.² ........................................ F16M 13/00
[58] Field of Search ............ 248/311, 310, 14, 101, 248/99, DIG. 7, 146, 235; 211/103, 13, 88, 75, 71, 104; 108/42, 44, 48

[56] References Cited
UNITED STATES PATENTS

| | | | |
|---|---|---|---|
| 1,228,098 | 5/1917 | Cole | 248/311 |
| 1,437,303 | 11/1922 | Hatch | 248/310 X |
| 1,596,346 | 8/1926 | Gibson | 211/104 |
| 1,665,724 | 4/1928 | Way | 248/101 |
| 2,116,576 | 5/1938 | Hormann | 248/DIG. 7 |
| 2,430,454 | 11/1947 | Cormier | 248/311 |
| 2,549,680 | 4/1951 | Fowle | 248/311 |
| 2,550,019 | 4/1951 | Murphy | 248/311 |
| 2,709,494 | 5/1955 | Luce | 248/310 X |
| 3,490,726 | 1/1970 | Mills | 248/313 |
| 3,534,933 | 10/1970 | Zimmerman | 248/14 |

*Primary Examiner*—Roy D. Frazier
*Assistant Examiner*—Robert W. Gibson, Jr.
*Attorney, Agent, or Firm*—Edward J. Quirk

[57] ABSTRACT

A wall-mountable rack for a liquefied gas bottle comprises a base having two vertical angle iron members, an angle iron support member extending horizontally from the base, the angle iron support member having its ends attached to the two base members and having its flanges directed upwardly and inwardly to provide horizontal and vertical support to a bottle placed thereon, and means for maintaining the angle iron support in a horizontal position.

4 Claims, 4 Drawing Figures

WALL RACK FOR LIQUEFIED GAS BOTTLES

BACKGROUND OF THE INVENTION

Campers, recreational vehicles, such as motor homes, some trailers, and other living units which can be moved from place to place usually require an auxiliary source of fuel for utilities. While some recreational vehicles which are located in mobile home parks on a semipermanent basis may be connected to sources of natural gas and/or electricity supplied by local utilities, most such vehicles use liquefied propane or butane or a mixture thereof as a source of fuel for the living unit. These liquefied petroleum gases (LPG) may be stored in large tanks of several hundred gallons, or may be obtained in standard sized portable containers of 5, 10, or 20 gallons. Specifications of these containers are prescribed by Federal law. These tanks may be stored at various locations inside or outside of the vehicle; however, many of the built-in storage installations are inherently unsafe.

In many cases, especially during times of heavy LPG usage, storage space for additional LPG bottles is highly useful. In view of the efficiently designed interiors of most mobile homes resulting in a minimum of unused space, there is usually insufficient storage space inside for extra LPG containers. In addition, a potential safety hazard may result from inside storage of these bottles. Accordingly, attempts have been made to build brackets or supports outside of the vehicle to hold the extra bottles. Many times these supports are adequate when the vehicle is stationary; however, some problems have been encountered with LPG containers coming loose or falling from outside supports onto the road while the vehicle is in motion.

It is therefore an object of the invention to provide an LPG bottle holder which can be mounted on the outside wall of a mobile home or other recreational vehicle, either as original equipment or as an add-on, which is compact but structurally strong.

It is a further object of this invention to provide an LPG bottle holder which firmly secures the bottle such that it can remain in place on the outside of a moving vehicle without danger of the bottle falling off of the holder.

SUMMARY OF THE INVENTION

The invention consists of a wall-mountable rack holder for standard size LPG containers. The holder comprises two parallel vertical angle iron base members, a rigid horizontal angle iron bottle support member having its ends attached to the two base members, the angle iron flanges directed so as to support the bottle horizontally and vertically. The vertical angle iron flange has two axially aligned holes adapted to receive bolts which penetrate the flange and the base of the LPG bottle.

DETAILED DESCRIPTION OF THE INVENTION

Figure 1:
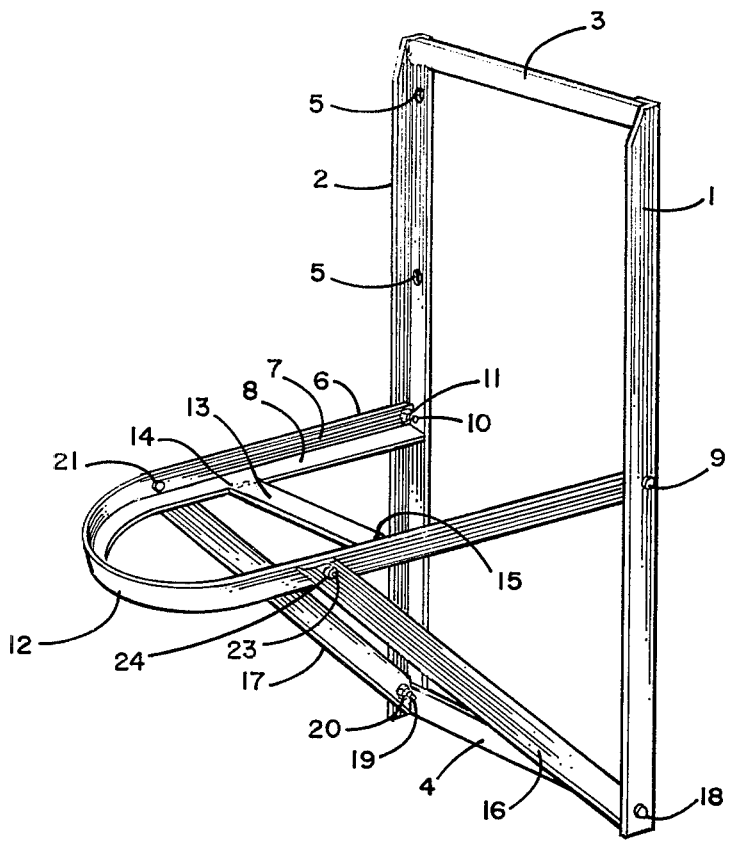
FIG. 1 is a perspective drawing of the rack of the invention.

Referring to FIG. 1, the wall-mountable base comprises parallel vertical angle iron members 1 and 2 which are spaced apart at a fixed distance by steel strips 3 and 4 located at approximately the top and bottom of the base. These strips are preferably welded to the angle iron members at the strip ends, but may be removably mounted, e.g., with bolts. The strips add strength to the base member and although the rack is operable without either of the strips, at least one strip is helpful in maintaining the rigidity of the base, especially if the bottle support section 6 is removably mounted to the base. Optional holes 5 in angle iron members 1 and 2 are used for mounting the unit on a wall, either by bolts, or by hanging on pegs or hooks. For permanent mounting, frame members 1 and 2 can be welded or riveted to the wall.

Rigid bottle support member 6 extends in a horizontal plane from the base member, and is fabricated from an angle iron having its vertical flange 7 extending upwardly and horizontal flange 8 extending inwardly. The ends of support member 6 are attached to the two vertical angle iron base members 1 and 2 by bolts 9 and 10. The bolts are secured by standard locking nuts on the inside of the angle iron member, shown as nut 11 for bolt 10.

Figure 2:
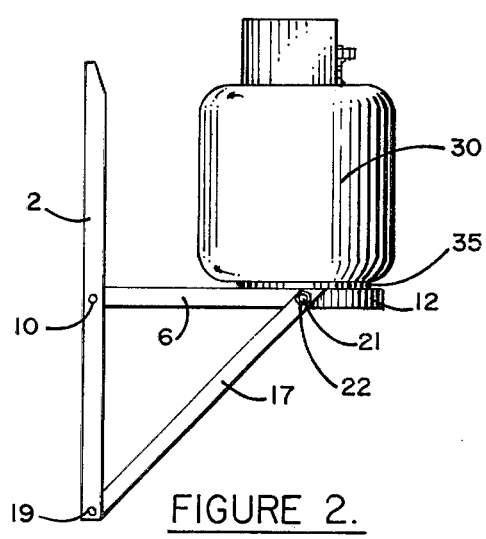
FIG. 2 is a side view of an LPG bottle in place on the rack.

The liquefied gas bottle rests on the forward curved section 12 of horizontal support 6, and on steel support strip 13. The bottle base, shown as 35 in FIG. 2, is circular, and the support structure is dimensioned such that the diameter of the curved section 12 is slightly greater than the diameter of the bottle base. Accordingly, the base of the bottle rests on horizontal flange 8, and is supported at the back by steel strip 13 which is welded to the angle iron at points 14 and 15. Additional support in the horizontal plane is provided to the bottle by vertical flange 7, which helps to prevent the bottle from sliding or tipping off of the support. If desired, the horizontal piece comprising support 6 and strip 13 may be fabricated by stamping from one piece of metal. Similarly, the base comprising elements 1, 2, 3, and 4 may be stamped from a single member.

The horizontal angle iron support member is further strengthened and maintained in a horizontal position by steel struts 16 and 17, which attach to the bottom of vertical base members 1 and 2, respectively, with bolts 18 and 19. Bolt 19 is held in place with locking nut 20, and bolt 18 is also locked with a nut (not shown). The struts are made from steel strips; however, if a large LPG container must be supported, the struts may also be made from angle iron.

The upper ends of struts 16 and 17 are attached to bottle support structure 6 at the ends of the diameter of the semicircular section 12. At this location, the axially aligned bolt-receiving holes in the vertical angle iron flanges coincide with the opposing holes in the cylindrical bottom of standard LPG containers. Accordingly, when the LPG bottle is in place, bolt 21 extends through the side wall of the cylindrical bottom flange on the bottle, and also through holes in the angle iron and in strut 17. The bolt is then fastened with a locking nut, which may be easily removable such as a wing nut, securing both the bottle and the strut to the angle iron. Similar fastening means exists on the opposite side of the support, where bolt 23 and nut 24 secure the other side of the bottle flange and the top of strut 16 to the angle iron. If desired, permanent fastening means such as welding may be used for these joints; this would likely be the case for a permanent, original equipment installation.

Figure 4:
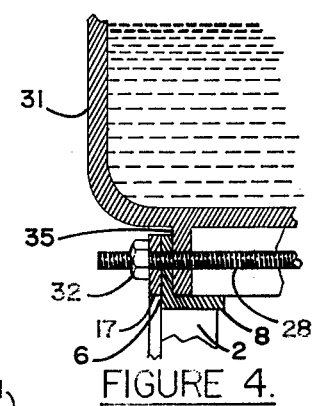
FIG. 4 is a cross-sectional view of an LPG bottle bolted in place on the rack.
Figure 3:
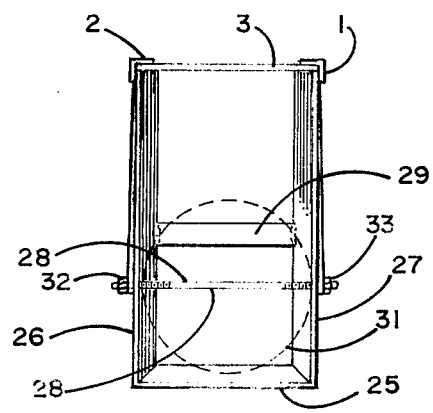
FIG. 3 is a detail drawing of an alternative design for the front of the rack support.

The fastening of the bottle to the structure is also seen in FIGS. 2–4. FIG. 2 shows a side view of LPG bottle 30 locked in place on the bottle holder with bolt 21 and fastening nut 22 being visible. Bolt 21 extends outwardly through the bottle base 35, the vertical flange of support 6, and strut 17, and is bolted on the outside.

Another suitable fastening arrangement is shown in FIG. 3, which shows a single long bolt 28 threaded on each end which can extend through the diametrically opposed holes in the bottle base, shown in phantom as 31, and through the vertical angle iron flanges of the support structure and the struts. The bolt is locked on either end with nuts 32 and 33. When removing the bottle from this rack, only one nut need be removed, and the bolt can be slipped out through one end. A long bolt having only one threaded end may be used instead of a double threaded bolt, if desired.

FIG. 3 also shows an alternate design for the horizontal support structure, with the angle iron support being fabricated from three welded angle iron sections. Parallel sections 26 and 27 make up the side members, and front section 25 is welded perpendicularly to sections 26 and 27 to form a squared-off front end of the support. Bottle bottom 31 then rests on the horizontal flanges of angle iron members 25, 26 and 27, and on supporting strip 29, which is also welded perpendicularly to members 26 and 27. In this manner, firm support for the bottle is maintained even though the front section is not curved to fit the cylindrical bottle base as shown in FIG. 1.

FIG. 4 shows cross-sectional detail of an LPG bottle bolted to the rack. Bottle 31 having cylindrical base 35 sets on the horizontal flange of angle iron 6. Long bolt 28, secured on the outside by nut 32, passes successively through holes in strut 17, angle iron 6, and bottle base 35, thus securing the bottle to the rack.

The dimensioning of the rack will vary depending on the LPG tank size to be supported and is easily within the skill of the art. For a standard tank meeting Interstate Commerce Commission specifications having an 8 inch base diameter, the distance between inside edges of the vertical angle iron flanges should be slightly more than 8 inches, e.g., 8 ¼ inches – 8 ¾ inches, at the holes. The back edge of support strip 13 (or 29) should be about 4 inches back from the center of the bolt holes in order to provide adequate support for the back edge of the bottle base. A typical height for angle iron members 1 and 2 is about 2 feet for a 5 gallon bottle. For an 8 inch diameter bottle base, the total distance from the back to the front of the rack unit is about 11 inches – 12 inches.

As pointed out above, parts of the unit may be stamped from sheet metal to provide a minimum number of pieces. However, in a particularly preferred embodiment of the invention, the unit is collapsible to enable easy packaging for storing or mailing. By removing bolts shown in FIG. 1 as 9, 10, 18, 19, 21, and 23, the unit separates into four sections (the base unit comprising members 1, 2, 3, and 4; the horizontal support comprising members 6 and 13; and the two struts 16 and 17). These four sections are easily and quickly assembled or torn down for storage.

The term "angle iron" as used herein for convenience to describe the material from which several pieces of the rack are fabricated means any rigid support member having two flanges located at right angles with respect to each other. The material need not be iron or steel, but may be any metal, plastic, or fiberglass material which has sufficient strength to provide support to the bottle.

While one specific embodiment of the invention has been described in detail, many modifications will be obvious to those skilled in the art which will be within the scope of the concept of the invention. The scope of the invention shall not be construed to be limited by materials of construction, methods of attachment of one piece to another, or methods of fabrication of the various pieces. Furthermore, features may be added to the rack of the invention, such as a cover to protect the bottle from the elements, and still be within the scope of the invention.

I claim:

1. A wall-mountable rack for safely securing a liquefied gas container having a base of substantially circular cross-section to the outer wall of a vehicle under rough road conditions, said base having axially aligned holes in opposite sides thereof, comprising:
  a base, attachable to a wall, comprising two vertical rigid members;
  a platform attached to and extending horizontally from the base having two spaced parallel angle iron sides with an upwardly directed vertical flange and an inwardly directed horizontal flange, the vertical flange on each side having an axially aligned hole adapted to receive bolt means for securing the base of a liquefied gas container to the platform;
  support means for maintaining the platform in the horizontal plane comprising rigid support members extending from each side of the platform downwardly toward the base, each support member having a hole in the upper end thereof axially aligned with the axially aligned holes in the vertical flange of the platform sides;
  bolts means extending through the holes in the support member, the vertical flange, and the container base, thereby rigidifying the rack and securing the container to the rack; and
  fastening means for securing the lower end of each support member to the base.

2. The rack of claim 1 wherein the two holes in the vertical flanges of the two sides are located at a distance from each other slightly greater than the outside diameter of the base of the container to be secured thereon.

3. The rack of claim 1 also comprising a single bolt adapted to extend through the axially aligned holes in the vertical flanges of the platform sides, and fastening means for securing the bolt in place.

4. The rack of claim 1 wherein the platform also comprises a flat rigid member extending between and secured to the horizontal flanges of the parallel angle iron sides, said member being located between the base and the front of the platform.

* * * * *